(12) United States Patent
Devaraj et al.

(10) Patent No.: US 11,080,040 B1
(45) Date of Patent: Aug. 3, 2021

(54) FIRMWARE UPGRADE FOR ACCESS POINTS

(71) Applicant: Hewlett Packard Enterprise Development LP, Houston, TX (US)

(72) Inventors: Sasindran Devaraj, Bangalore (IN); Praveen Kumar, Bangalore (IN); Preeti Bhagavan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/879,144

(22) Filed: May 20, 2020

(51) Int. Cl.
| | |
|---|---|
| *G06F 9/44* | (2018.01) |
| *G06F 8/65* | (2018.01) |
| *G06F 9/4401* | (2018.01) |
| *H04L 29/08* | (2006.01) |
| *H04W 88/08* | (2009.01) |
| *G06F 8/658* | (2018.01) |

(52) U.S. Cl.
CPC .............. *G06F 8/65* (2013.01); *G06F 9/4401* (2013.01); *H04L 67/34* (2013.01); *G06F 8/658* (2018.02); *H04W 88/08* (2013.01)

(58) Field of Classification Search
CPC ....................................................... G06F 9/44
See application file for complete search history.

(56) References Cited

U.S. PATENT DOCUMENTS

| | | |
|---|---|---|
| 8,819,663 B2 | 8/2014 | Goel et al. |
| 9,867,083 B2 | 1/2018 | Liu et al. |
| 2006/0256741 A1* | 11/2006 | Nozaki ................ H04L 45/00 370/278 |
| 2013/0225181 A1* | 8/2013 | Radulescu ........... H04W 36/22 455/442 |
| 2018/0167838 A1* | 6/2018 | Mitsui .................. H04W 24/10 |
| 2019/0379764 A1 | 12/2019 | Andreola et al. |
| 2020/0099578 A1* | 3/2020 | Venkateshwaran ... H04L 41/082 |

FOREIGN PATENT DOCUMENTS

| | | |
|---|---|---|
| KR | 101947528 | 2/2019 |

OTHER PUBLICATIONS

Information About FlexConnect AP Image Upgrades, Retrieved Feb. 27, 2020, 3 Pgs, (Web Page).
Inventory Management with Cisco Prime LAN Management Solution 4.1, Feb. 16, 2018, 38 Pgs., (Web Page).
Prince Samar, Aruba Instant: Leveraging New and Enhanced Availability and Flexibility Features, (Research Paper), Sep. 2019, 53 Pgs.

* cited by examiner

*Primary Examiner* — Jae U Jeon
(74) *Attorney, Agent, or Firm* — Hewlett Packard Enterprise Patent Department

(57) ABSTRACT

Examples of upgrading a plurality of access points (APs) are described. In an example, responsive to a firmware upgrade being initiated, the plurality of APs having an identical AP type are grouped into a plurality of subsets. A primary seed AP is identified corresponding to each of the plurality of subsets, based on a resource availability of each of the plurality of APs. The primary seed AP is to download a firmware upgrade image from a remote server. Each of the plurality of APs except the primary seed AP is categorized as a non-seed AP. The non-seed AP is to download the firmware upgrade image from the primary seed AP. A network address of the remote server is sent to the primary seed AP for downloading the firmware upgrade image.

20 Claims, 6 Drawing Sheets

FIRMWARE UPGRADE FOR ACCESS POINTS

BACKGROUND

A computer network includes a variety of networking devices, such as access points, controllers, gateways, switches, etc., which perform different network operations, such as network access, authentication, and routing network traffic to provide connectivity. A Wireless Local Area Network (WLAN) may include a plurality of Access Points (APs), as elements of the WLAN. These APs in the deployed network may be referred to as deployed APs.

An AP may have an AP type indicative of hardware configuration/model/design of the AP and a corresponding AP firmware compatible with the AP type. The firmware enables operation of the AP to provide functionalities for network access and control. The firmware may be upgraded from time to time to support additional features, to provide higher levels of functionality to the AP, and/or to implement bug fixes. Firmware upgrades specific to AP types may be released for enhancement of additional features and functionalities in the APs.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
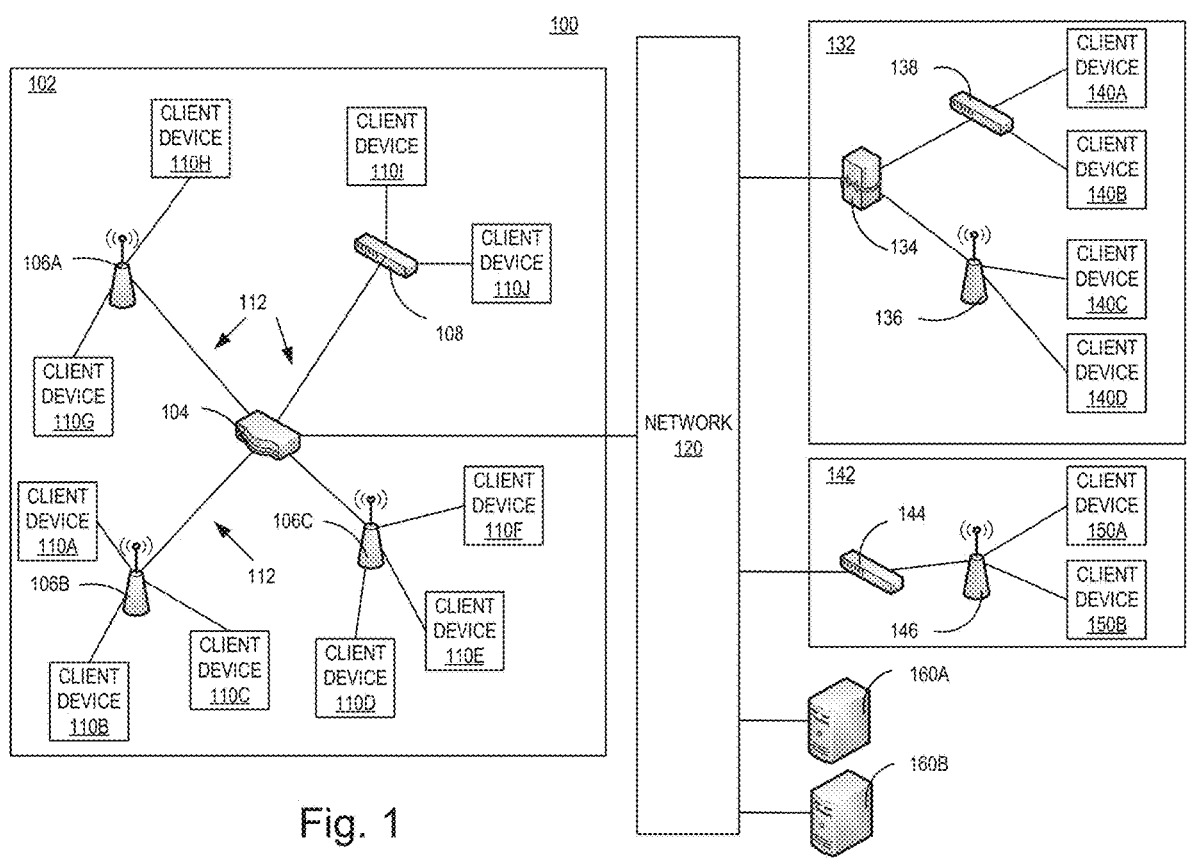
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Network access of devices, such as computers, laptops, smartphones, and other handheld devices attempting to connect to a computer network, such as a Wireless Area Network (WAN) or a Local Area Network (LAN) are generally controlled by network devices, such as APs. The AP firmware included in the APs enable operation of the APs. The AP firmware may be upgraded based on recent versions of firmware releases.

Upgrading an AP includes upgrading a version of the firmware of the AP by installing, for example, a higher version of the firmware. Generally, firmware upgrade of a cluster of access points (APs) is initiated from a cloud-based network management platform. The network management platform may identify the cluster of APs for the upgrade and select one of the APs as a seed AP. Generally, a first AP in a list of the cluster of APs going for the upgrade is identified as the seed AP. The seed AP is designated to download an image file for firmware upgrade from a remote server and host the image file to be locally downloaded, from the seed AP, by other APs in the cluster. The network management platform sends a network address, such as a Uniform Resource Locator (URL), of the remote server to the seed AP. The remote server stores the image file for the firmware upgrade. Based on the network address, the seed AP contacts the remote server and downloads the image file for the firmware upgrade. Once the seed AP downloads the image file, the seed AP serves the image file to other APs over WLAN which can download the image file from the Seed AP. Once all the APs in the group have downloaded the image file from the seed AP, the image file may be installed in the APs and the APs may be rebooted.

Thus, in the above-explained process for firmware upgrade, a single seed AP downloads the image file from the remote server and then other APs download the image file from the seed AP over WLAN. Since the seed AP serves the image file to multiple APs simultaneously, resource availability on the seed AP is crucial. The seed AP is generally selected randomly from the cluster of APs going for the upgrade. The seed AP selected in this manner may have resource constraints, such as low Central Processing Unit (CPU)/processor speed, Wide Area Network (WAN) link slowness, low availability of volatile memory, etc. Due the resource constraints, the seed AP may not be able to process download requests for the image file from other APs in the duster.

Further, in case the seed AP is subjected to a failure, all the APs in the duster may contact the remote server to download the image file which may lead to substantially high WAN bandwidth consumption leading to clogging of the network. Further, download of the image file by the other APs, from the seed AP, generally occurs sequentially in batches, which may result in greater time consumption for download with a likelihood of higher downtime for the duster going for the upgrade.

The present disclosure relates to firmware upgrades for APs where the APs are grouped into subsets with a seed AP identified per subset, which may facilitate in reducing the resource requirements and enable load balancing between seed APs, enhance reliability and redundancy in the firmware upgrade process. According to the present disclosure, a plurality of APs having an identical AP type are grouped into a plurality of subsets. The AP type is indicative of hardware configuration of each of the plurality of APs. Based on a resource availability of each of the APs, a primary seed AP corresponding to each of the subsets is identified. In an example, resource availability may be determined based on Central Processing Unit (CPU) usage and memory usage of each of the plurality of APs. The primary seed AP is configured to download a firmware upgrade image from a remote server. The primary seed AP corresponding to a subset is designated to provide the firmware upgrade image for download by other APs in the subset. The firmware upgrade image is a binary file that may contain the complete instruction set of a device or a subset of it. The firmware upgrade image may consist of a differential update over previous versions of the firmware. Each of the APs, except the primary seed AP, are categorized as a non-seed AP. The non-seed AP is configured to download the firmware upgrade image locally from the primary seed AP over, say, a Wireless Local Area Network (WLAN) connection. A network address of the remote server is sent to the primary seed AP for downloading the firmware upgrade image. The primary seed AP corresponding to each of the subsets may download the firmware upgrade image from the remote server and may provide the firmware upgrade image for download by non-seed APs grouped under each of the plurality of subsets.

In the present disclosure, since the primary seed AP is selected based on resource availability, likelihood of resource constraints may be reduced consequently reducing chances of failure and enhancing the speed of the firmware upgrade. Also, since the plurality of APs going for the upgrade are divided into subsets and a primary seed AP is identified corresponding to each subset, failure of a single primary seed or some of the primary seed APs may not jeopardize the entire firmware upgrade process for the plurality of APs, consequently improving redundancy of the firmware upgrade process. Also, a primary seed AP per subset may allow non-seed APs in each subset to download the firmware upgrade image from respective primary seed APs, in parallel, thereby enhancing the overall speed of the firmware upgrade process. Further, distribution of the plurality of APs into subsets may provide efficient load balancing among respective primary seed APs corresponding to each of the subsets thereby enhancing speed of download of the firmware upgrade image.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Figure 2:
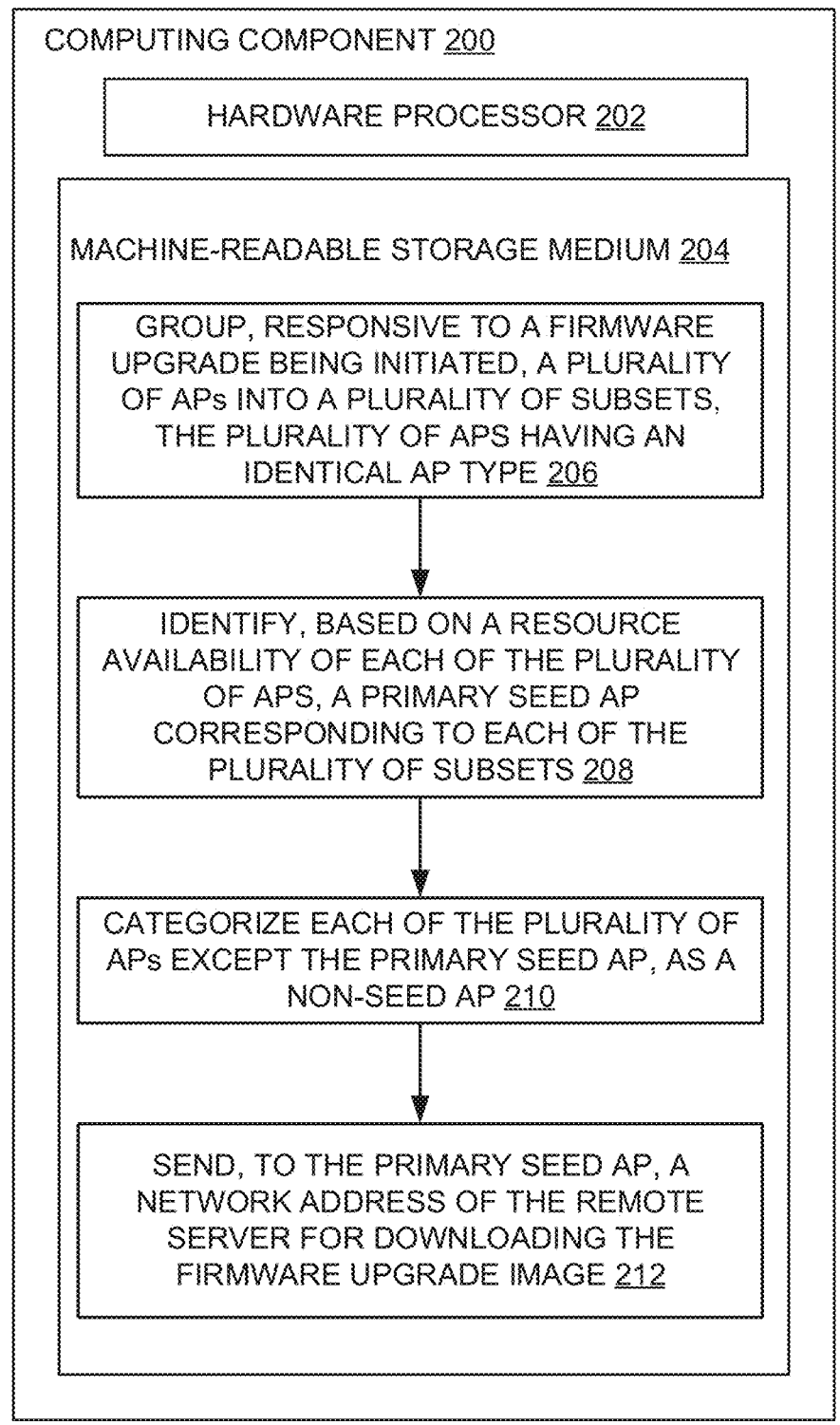
FIG. 2 is a block diagram of an example computing component or device for upgrading a firmware of an access point in accordance with an embodiment.

FIG. 2 is a block diagram of an example computing component or device 200 for upgrade of a firmware of an access point in accordance with an embodiment. In an example, the computing component 200 may function as a network management device, as referred to in embodiments described herein. Computing component 200 may be, for example, a cloud-based network management platform. In an example, the computing component 200 is configured to deploy, manage, and optimize WLAN, wired LANs, Virtual Private Networks (VPNs), and Software Defined Networking in Wide Area Networks (SD-WANs).

In the example implementation of FIG. 2, the computing component 200 includes a hardware processor, 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-212, to control processes or operations for upgrading firmware in APs. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-212.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 3, at a differing level of detail.

In step 206, a plurality of APs is grouped into a plurality of subsets. In an example, the plurality of APs may be wireless access points, such as wireless access points 106*a-c*, 136, and 146 of FIG. 1. The plurality of APs has identical hardware configuration/model number, i.e., they have an identical AP type. Since the APs have an identical AP type, a single firmware upgrade image may be compatible to the all APs in the plurality. Consequently, same firmware upgrade image may be used to upgrade the firmware of the plurality of APs. In other words, the firmware upgrade image is based on the identical AP type of the plurality of APs. In an example scenario, where multiple APs of different AP types are to be upgraded, the method as explained through FIG. 2 shall be executed for each plurality of APs having identical AP type. In an example, a firmware upgrade may be initiated by the computing component 200 or by the plurality of APs. Responsive to initiating the firmware upgrade, the plurality of APs is grouped into the plurality of subsets.

In step 208, a primary seed AP corresponding to each of the plurality of subsets is identified based on a resource availability of each of the plurality of APs. In an example, low CPU and memory usage indicates high resource availability for an AP. Each AP in a subset may be assigned a weight based on its CPU and memory usage. The AP having the highest weight in the subset may be identified as a primary seed AP corresponding to that subset. The primary seed AP hosts the firmware upgrade image for download by other APs in the subset. The number of primary seed APs is equal to the number of subsets into which the plurality of APs is grouped. The primary seed AP may download the firmware upgrade image from a remote server, such as the servers 160a-b of FIG. 1, via a network, such as the network 120 of FIG. 1. In an example, the primary seed AP may download the firmware upgrade image from the remote server by accessing an external network, such as the internet, via a WAN connection.

In step 210, each of the plurality of APs except the primary seed AP, is categorized as a non-seed AP. A non-seed AP in a subset is to download the firmware upgrade image from a respective primary seed AP corresponding to the subset. The non-seed APs may download the firmware upgrade image from respective primary seed APs locally over a wired or wireless local connection, such as the wired or wireless connections 112 of FIG. 1. In an example, the non-seed APs may download the firmware upgrade image from the primary seed AP via a wired LAN and/or a WLAN connection.

In step 212, a network address of the remote server is sent to the primary seed AP corresponding to each of the subsets. Based on the network address, the primary seed AP may access the remote server for downloading the firmware upgrade image. Thus, a primary seed AP corresponding to each subset may download the firmware upgrade image and serve the firmware upgrade image to the non-seed APs in the subset. Since, a primary seed AP is allocated per subset, therefore, load on the Primary seed APs may be balanced and failure of some of the primary seed APs does not jeopardize the firmware upgrade process for the plurality of APs. Also, since the primary seed APs per subset are selected based on resource availability, chances of failure in the primary seed AP may be reduced.

Figure 3:
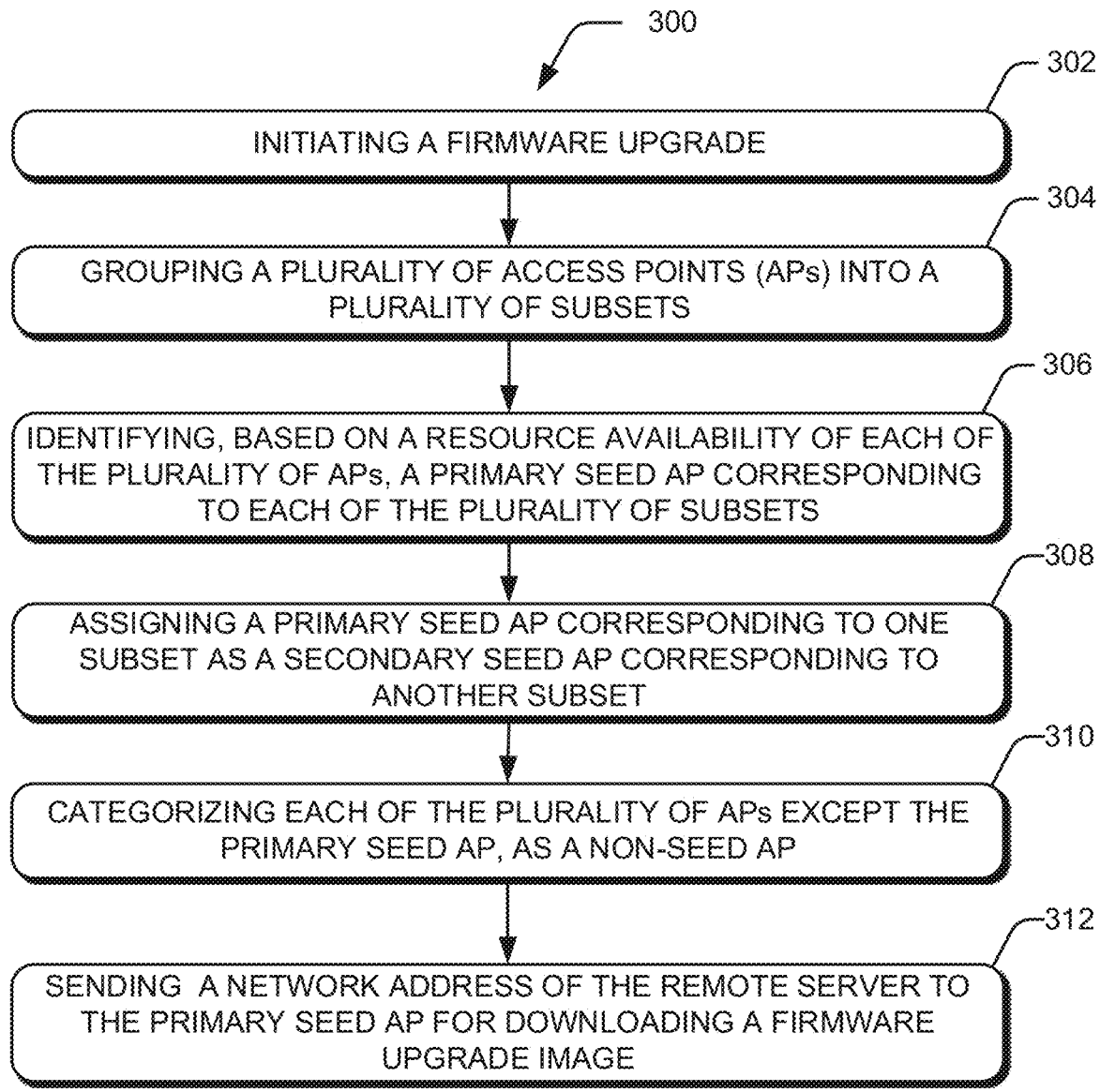
FIG. 3 illustrates an example method for upgrading access points in accordance with an embodiment.

FIG. 3 illustrates an example method 300 for upgrading APs in accordance with an embodiment. The method 300 may be executed by a network management device, such as a cloud-based network management platform (not shown). The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as the hardware processor 202, of a computing component, such as the computing component 200. Further, although the method 300 is described in context of the aforementioned computing component 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a firmware upgrade may be initiated based on a firmware upgrade request received by a network management device from the plurality of APs, such as the APs 106a-c of FIG. 1. In an example, the APs 106a-c may generate the firmware upgrade request based on an input from a network administrator and then the APs may send the firmware upgrade request to the network management device via a controller, such as the controller 104 of FIG. 1. Alternatively, in another example, the network management device may initiate the firmware upgrade based on a firmware upgrade schedule indicative of firmware upgrades to be undertaken at predefined time intervals. For example, the network management device may schedule a firmware upgrade for the plurality of APs at an interval of one month. In an example, the network management device may initiate the firmware upgrade based on an input from a network administrator.

Responsive to the firmware upgrade being initiated, the plurality of APs having an identical AP type which are going for the upgrade are grouped into a plurality of subsets, at block 304. The plurality of subsets is based on a total count of the plurality of APs and download request processing capacity of a primary seed AP. The download request processing capability is determined based on a maximum number of simultaneous download requests of the firmware upgrade image that a single primary seed AP is capable to process.

Consider 'X' denotes a total count of the plurality of APs going for the upgrade:
'Y' denotes 50% of the download request processing capability, i.e., 50% of the maximum number of APs that the primary seed AP can serve for simultaneous download of the firmware upgrade image; and
'Z' denotes a number of subsets into which the plurality of APs are to be grouped.
Then, $$Z = \text{quotient of } (X/Y) = A, \text{ If } X \text{ MOD } Y = 0; \text{ and} \quad \text{(Equation 1)}$$

$$Z = A+1, \text{ If } X \text{ MOD } Y \neq 0 \quad \text{(Equation 2)}$$

Consider that, in an example, AP1, AP2, AP3, . . . , AP43, AP44, and AP45 having identical AP type are going for firmware upgrade, then, X=45. Consider that the download request processing capability is 20, i.e., maximum number of APs that the primary seed AP can serve for simultaneous download of the firmware upgrade image is 20, then, Y=10 Therefore, based on the above equations (1) and (2), A=quotient of X/Y=quotient of 45/10=4; X MOD Y=45 MOD 10=5.

$$\text{Since, } X \text{ MOD } Y \neq 0, Z = A+1 = 4+1 = 5; \quad \text{(Equation 3)}$$

Therefore, in the above example with 45 APs going for firmware upgrade, the APs are grouped into 5 subsets. In an example, the 45 APs may be grouped into the 5 subsets, as shown below in Table 1.

TABLE 1

| Subset | Access point (AP) |
|---|---|
| 1 | AP1 to AP10 |
| 2 | AP11 to AP20 |
| 3 | AP21 to AP30 |
| 4 | AP31 to AP40 |
| 5 | AP41 to AP45 |

At block 306, based on a resource availability of each of the plurality of APs, the primary seed AP is identified corresponding to each of the plurality of subsets. Thus, in the above example with 45 APs going for the firmware upgrade, a primary seed AP is identified for each of the 5 subsets. Therefore, the number of primary seed APs is identical to the number of subsets into which the plurality of APs is grouped.

In an example, data relating to resource usage for the plurality of APs including WAN uplink health status, CPU Status, Memory Status and client connection status may be stored in the cloud-based network management device. Based on this data, the network management device may determine resource availability of each of the plurality of APs. In an example, the resource availability is determined as a function of Central Processing Unit (CPU) usage and memory usage of each of the plurality of APs. A score may be given for each resource parameter, such as CPU usage and memory usage. Exemplary scores may be derived as "CPU score (C)=100−current CPU utilization of an AP in percentage" and "Memory score (M)=100−current memory utilization of an AP in percentage". From this a resource score (R) may be derived as, R=C+M. Within a subset of APs, an AP having the highest value for 'R' may be identified as a primary seed-AP corresponding to the particular subset. In an example, if two or more APs have an identical resource score R, then the AP with lowest mac-address can be picked as the primary seed AP.

Consider that based on equation (3) and the resource availability of the APs, AP9, AP11, AP23, AP35, and AP44 are identified as primary seed APs corresponding to each of the 5 subsets. Each of the primary seed APs, can communicate with a remote server, such as the servers 160a-b, to download the firmware upgrade image from the remote server.

In an example, at block 308, a primary seed AP corresponding to a first subset of the plurality of subsets is assigned as a secondary seed AP corresponding to a second subset of the plurality of subsets. In an example, a primary seed AP for one subset of the plurality of subsets may be assigned as a secondary seed AP for another subset in a round robin fashion. Thus, as per the example with 45 APs going for the firmware upgrade, the primary and secondary seed APs per subset may be identified as shown in Table 2 below.

TABLE 2

| Subset | Primary seed AP | Secondary seed AP |
|---|---|---|
| 1 | AP9 | AP11 |
| 2 | AP11 | AP23 |
| 3 | AP23 | AP35 |
| 4 | AP35 | AP44 |
| 5 | AP44 | AP9 |

As shown in Table 2, AP 11 is the secondary seed AP corresponding to subset 1 and the primary seed AP corresponding to subset 2, AP 23 is the secondary seed AP corresponding to subset 2 and the primary seed AP corresponding to subset 3. Thus, a combination of primary seed AP and secondary seed AP corresponding to each of the plurality of subsets is non-identical, as can be seen from Table 2. The secondary seed AP corresponding to a subset is to host the firmware upgrade image for download by non-seed APs grouped under the subset, responsive to a failure in the primary seed AP corresponding to the subset. If AP11 is subjected to a failure, then non-seed APs from subset 2 can download the firmware upgrade image from AP23, thereby achieving redundancy, while, AP23, as a primary seed AP, also serves the firmware upgrade image to non-seed APs grouped in subset 3. Therefore, in case of a failure in the primary seed AP, the non-seed APs in the subset can download the firmware upgrade image locally from the secondary seed AP corresponding to the subset, instead of contacting the remote server over WAN. Thus, consumption of WAN bandwidth by the non-seed APs is reduced thereby enhancing speed of the firmware upgrade process.

Further, each of the plurality of APs except the primary seed AP corresponding to each of the plurality of subsets is categorized/labelled as a non-seed AP, at block 310. Thus, in the example, the non-seed APs in each subset is shown as below in Table 3.

TABLE 3

| Subset | Primary seed AP | Secondary seed AP | Non-seed AP |
|---|---|---|---|
| 1 | AP9 | AP11 | AP1 to AP8 and AP10 |
| 2 | AP11 | AP23 | AP12 to AP20 |
| 3 | AP23 | AP35 | AP21, AP22, and AP23 to AP30 |
| 4 | AP35 | AP44 | AP31 to AP34 and AP36 to AP40 |
| 5 | AP44 | AP9 | AP41 to AP43 and AP45 |

Thus, AP1 to AP8 and AP10 download the firmware upgrade image from AP9 and in case of failure of AP9 from secondary seed AP corresponding to subset 1, AP11. Likewise, AP12 to AP20 download the firmware upgrade image from AP11 and in case of failure of AP11 from secondary seed AP corresponding to subset 2, AP23. This is also applicable to non-seed APs in other subsets. Each of the non-seed APs in a subset of the plurality of subsets is to download the firmware upgrade image from the primary seed AP corresponding to the subset and in case of failure of the primary seed AP, from the secondary seed AP corresponding to the subset.

At block 312, a network address of the remote server may be sent to the primary seed AP corresponding to each of the plurality of subsets for downloading the firmware upgrade image. In an example, the network management device may send the network address, such as an URL of the remote server, along with an identity information, such as file name, of the firmware upgrade image to the primary seed AP, such as AP9, AP11, AP23, AP35, and AP44, corresponding to each of the plurality of subsets.

Figure 4A:
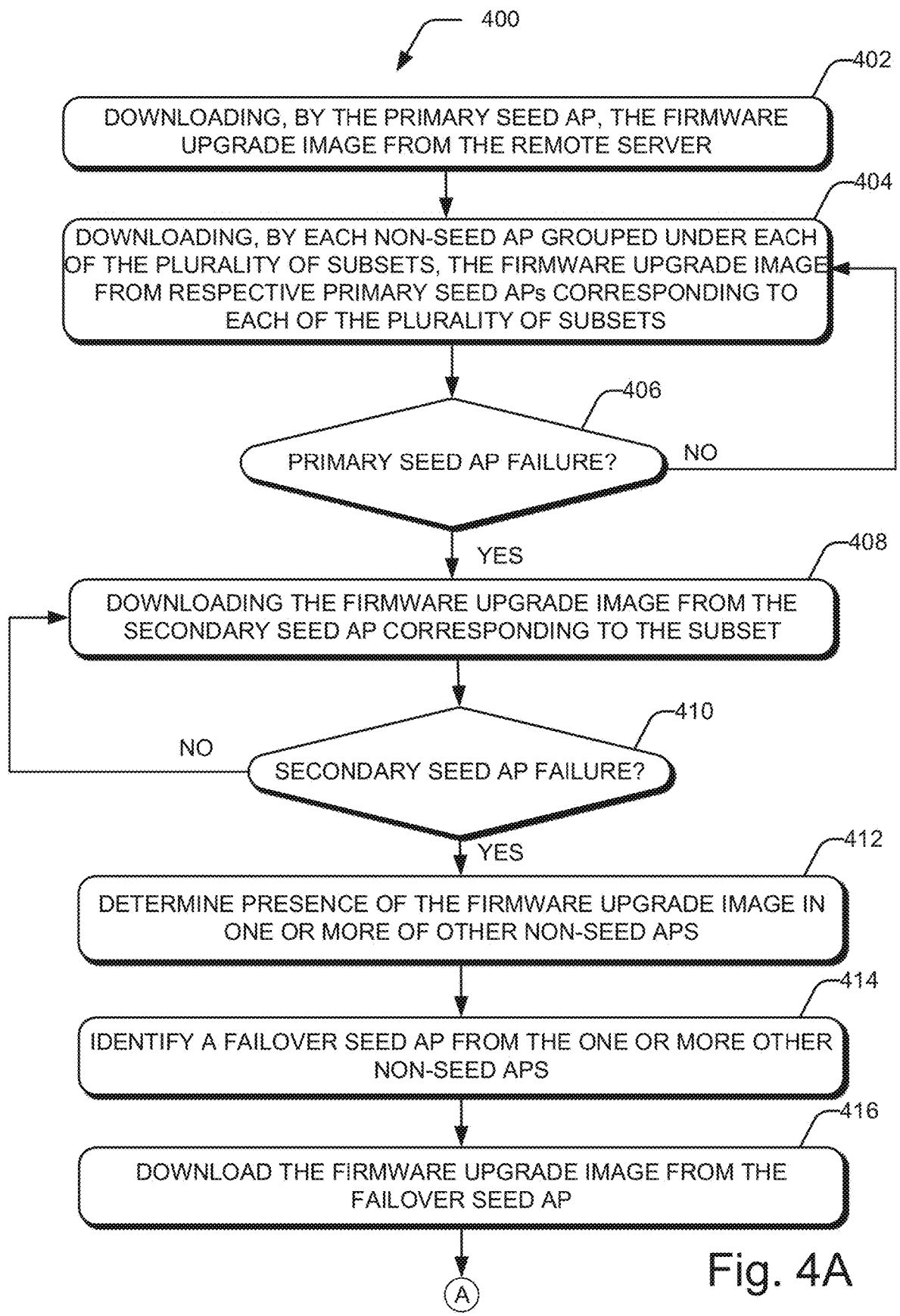
FIGS. 4A and 4B illustrate an example method for upgrading access points in accordance with an embodiment.
Figure 4B:
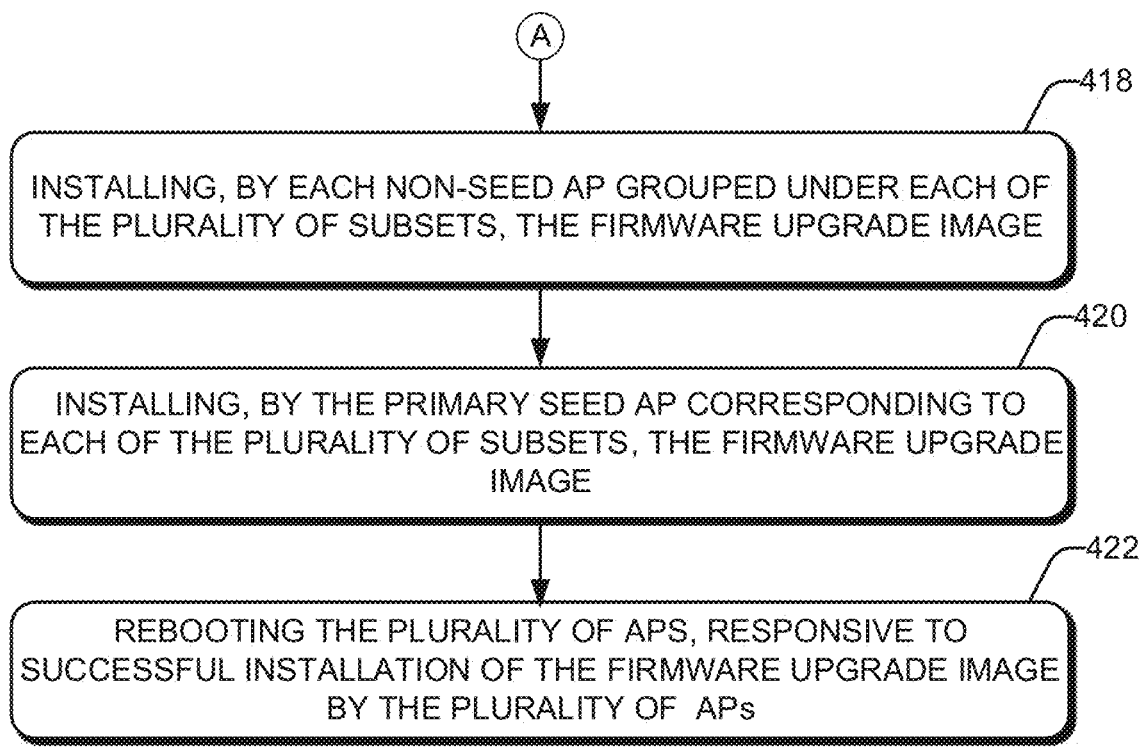

Further details of the firmware upgrade process are described referring to FIGS. 4A and 4B. FIGS. 4A and 4B illustrate an example method 400 for upgrading APs in accordance with an embodiment. The method 400 may be executed by an access point (AP), such as APs 106a-c of FIG. 1. The method 400 can be implemented by processing resource(s) or computing device(s) through any suitable hardware, a non-transitory machine readable medium, or combination thereof. In an example, the method 400 may be performed by computer-readable instructions, which include instructions stored on a medium and executable by a processing resource of an AP. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

At block 402, each of the primary seed APs, such as AP9, AP11, AP23, AP35, and AP44 as illustrated in Table 2 in the discussion of FIG. 3, download the firmware upgrade image from the remote server, such as servers 160a-b of FIG. 1, based on the network address of the remote server received by the primary AP from the network management device. In an example, once the firmware upgrade image is downloaded by the primary seed AP, a flash ROM of the primary seed AP is updated with the firmware upgrade image and a copy of the firmware upgrade image is maintained in a volatile memory of the primary seed AP. The copy stored in the volatile memory is used to serve the firmware upgrade image to the non-seed APs.

At block 404, each non-seed AP grouped under each of the plurality of subsets, downloads the firmware upgrade image from respective primary seed APs corresponding to each of the plurality of subsets, as illustrated in Table 3 in the description of FIG. 3. At block 406, it is determined whether a primary seed AP corresponding to a subset of the plurality of subsets is subjected to a failure. In an example, if a non-seed AP grouped under a subset fails to download the firmware upgrade image from the primary seed AP corresponding to the subset or the primary seed AP corresponding to the subset is unreachable for download, then the primary seed AP may be determined to be subjected to a failure. If it is determined that there is no failure at the primary seed AP ('No' branch from block 406), non-seed APs in the subset may continue to download the firmware upgrade image from the primary seed AP. However, if a failure is determined at the primary seed AP corresponding to a particular subset ('YES' branch from block 406), the non-seed APs grouped under that subset download the firmware upgrade image from the secondary seed AP corresponding to the subset, at block 408.

At block 410, it is determined whether a secondary seed AP corresponding to a subset of the plurality of subsets is subjected to a failure. In an example, if a non-seed AP grouped under a subset fails to download the firmware upgrade image from the secondary seed AP corresponding to the subset or the secondary seed AP corresponding to the subset is unreachable for download, then the secondary seed AP may be determined to be subjected to a failure. If it is determined that there is no failure at the secondary seed AP ('No' branch from block 410), the non-seed AP in the subset may continue to download the firmware upgrade image from the secondary seed AP.

However, if the non-seed AP encounters a failure in downloading the firmware upgrade image from the secondary seed AP ('YES' branch from block 410), presence of the firmware upgrade image in one or more of other non-seed APs in the subset are determined, based on a query message sent to the other non-seed APs grouped under the subset. For example, referring to Table 3 in the description of FIG. 3, consider that non-seed APs, AP1 to AP7 have completed download of the firmware upgrade image and AP8, is attempting download of the firmware upgrade image from the primary seed AP, AP9. Consider that primary seed AP, AP9 and secondary seed AP, AP11 are subjected to a failure. At block 412, AP8 checks for presence of the firmware upgrade image in one or more of the other non-seed APs, i.e., AP1 to AP7 and AP10. AP8 may send a multicast query message to AP1-AP7 and AP10 enquiring presence of the firmware upgrade image. Since, AP1-AP7 have already downloaded the firmware upgrade image, each of AP1-AP7 may send a unicast response to AP8 confirming presence of the firmware upgrade image. Based on the unicast response from AP1-AP7, AP8 may determine that the firmware upgrade image is present in non-seed APs, AP1-AP7.

At block 414, a failover seed AP is identified from the one or more other non-seed APs, based on resource availability of each of the one or more other non-seed APs. In an example, resource availability may be determined based on CPU and memory usage of the other non-seed APs. Among the non-seed APs having the firmware upgrade image downloaded, a non-seed AP having highest resource availability may be selected as the failover seed AP. In the example, AP1-AP7 has already downloaded the firmware upgrade image. Considering that AP5 has the highest resource availability, AP5 may be identified as the failover AP and AP8 may download the firmware upgrade image from AP5. Thus, the non-seed AP downloads the firmware upgrade image from the failover seed AP, at block 416.

At block 418, responsive to completion of download of the firmware upgrade image by each non-seed AP grouped under each of the plurality of subsets, each of the non-seed APs install the firmware upgrade image. At block 420, the primary seed AP corresponding to each of the plurality of subsets, install the firmware upgrade image. At block 422, the plurality of APs is rebooted, responsive to successful installation of the firmware upgrade image by the plurality of APs. In an example, depending on the type of firmware upgrade, the APs may be simultaneously or sequentially rebooted.

Figure 5:
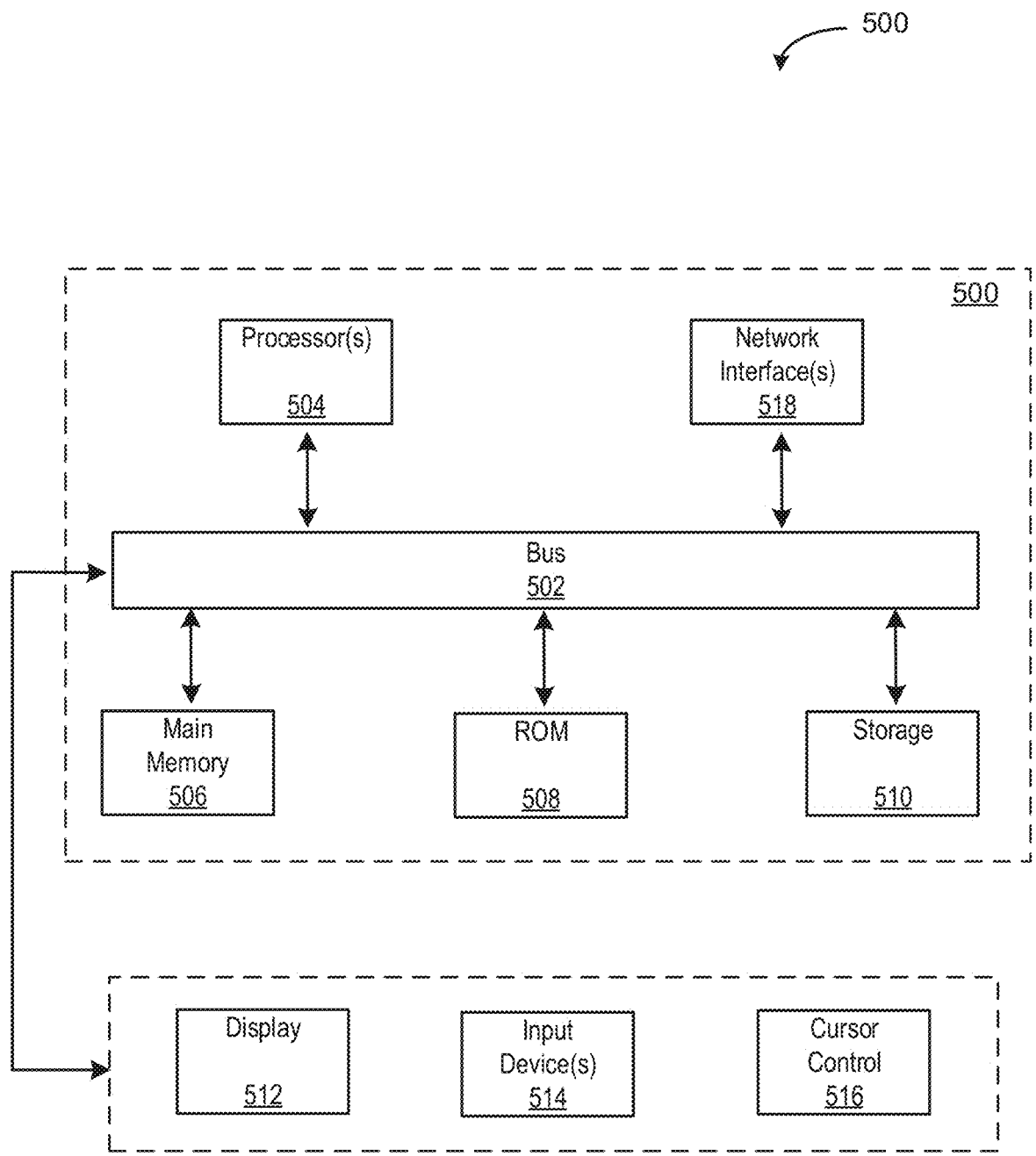
FIG. 5 depicts a block diagram of an example computer system in which the embodiments described herein may be implemented.

FIG. 5 depicts a block diagram of an example computer system 500 in which the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Per, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518. The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for upgrading a plurality of access points (APs), the method comprising:
   grouping, by a network management device and responsive to a firmware upgrade being initiated, the plurality of APs into a plurality of subsets, the plurality of APs having an identical AP type;
   identifying, by the network management device and based on a resource availability of each of the plurality of APs, a primary seed AP corresponding to each of the plurality of subsets, wherein the primary seed AP is to download a firmware upgrade image from a remote server;
   categorizing, by the network management device, each of the plurality of APs except the primary seed AP, as a non-seed AP, wherein the non-seed AP is to download the firmware upgrade image from the primary seed AP; and
   sending, by the network management device and to the primary seed AP, a network address of the remote server for downloading the firmware upgrade image.

2. The method as claimed in claim 1, wherein the plurality of subsets is based on a total count of the plurality of APs and download request processing capacity of the primary seed AP.

3. The method as claimed in claim 1, wherein the resource availability is determined based on Central Processing Unit (CPU) usage and memory usage of each of the plurality of APs.

4. The method as claimed in claim 1, further comprising, sending to a non-seed AP grouped under a subset of the plurality of subsets, a network address of the primary seed AP corresponding to the subset.

5. The method as claimed in claim 1, wherein a primary seed AP corresponding to a first subset of the plurality of subsets is assigned as a secondary seed AP corresponding to a second subset of the plurality of subsets, wherein a combination of primary seed AP and secondary seed AP corresponding to each of the plurality of subsets is non-identical.

6. The method as claimed in claim 5, wherein the secondary seed AP corresponding to a subset of the plurality of subsets is to host the firmware upgrade image for download by non-seed APs grouped under the subset, responsive to a failure in the primary seed AP corresponding to the subset.

7. The method as claimed in claim 1, wherein the firmware upgrade image is based on the identical AP type of the plurality of APs.

8. The method as claimed in claim 1, wherein the firmware upgrade is initiated based on one of a firmware upgrade request received from the plurality of APs and a firmware upgrade schedule of the network management device.

9. The method as claimed in claim 1, wherein the method further comprises:
   downloading, by the primary seed AP, the firmware upgrade image from the remote server;
   downloading, by each non-seed AP grouped under each of the plurality of subsets, the firmware upgrade image from respective primary seed APs corresponding to each of the plurality of subsets;
   installing, by each non-seed AP grouped under each of the plurality of subsets, the firmware upgrade image;
   installing, by the primary seed AP corresponding to each of the plurality of subsets, the firmware upgrade image; and
   rebooting the plurality of APs, responsive to successful installation of the firmware upgrade image by the plurality of APs.

10. A system comprising:
    a plurality of access points (APs); and
    a network management device comprising:
      a processor; and
      a memory coupled to the processor, the memory storing instructions executable by the processor to:
        group, responsive to a firmware upgrade being initiated, the plurality of APs into a plurality of subsets, the plurality of APs having an identical AP type;
        identify, based on a resource availability of each of the plurality of APs, a primary seed AP corresponding to each of the plurality of subsets, wherein the primary seed AP is to download a firmware upgrade image from a remote server;
        categorize each of the plurality of APs except the primary seed AP, as a non-seed AP, wherein the non-seed AP is to download the firmware upgrade image from the primary seed AP; and send, to the primary seed AP, a network address of the remote server for downloading the firmware upgrade image.

11. The system as claimed in claim 10, wherein the plurality of subsets is based on a total count of the plurality of APs and download request processing capacity of the primary seed AP.

12. The system as claimed in claim 10, wherein the resource availability is determined based on Central Processing Unit (CPU) usage and memory usage of each of the plurality of APs.

13. The system as claimed in claim 10, wherein the processor is further to send to a non-seed AP grouped under a subset of the plurality of subsets, a network address of the primary seed AP corresponding to the subset.

14. The system as claimed in claim 10, wherein a primary seed AP corresponding to a first subset of the plurality of subsets, is assigned as a secondary seed AP corresponding to a second subset of the plurality of subsets, wherein a combination of primary seed AP and secondary seed AP corresponding to each of the plurality of subsets is non-identical.

15. The system as claimed in claim 10, wherein the secondary seed AP corresponding to a subset of the plurality of subsets is to host the firmware upgrade image for download by non-seed APs grouped under the subset, responsive to a failure in the primary seed AP corresponding to the subset.

16. The system as claimed in claim 10, wherein the firmware upgrade image is based on the identical AP type of the plurality of APs.

17. The system as claimed in claim 10, wherein:
responsive to a download failure of the firmware upgrade image by a non-seed AP grouped under a subset of the plurality of subsets, wherein a primary seed AP and a secondary seed AP corresponding to the subset is unreachable, the non-seed AP is to:
  determine, based on a query message sent to other non-seed APs grouped under the subset, presence of the firmware upgrade image in one or more of the other non-seed APs; and
  identify a failover seed AP, from the one or more other non-seed APs, based on resource availability of each of the one or more other non-seed APs, wherein the non-seed AP is to download the firmware upgrade image from the failover seed AP.

18. The system as claimed in claim 10, wherein: the primary seed AP is to:
  download the firmware upgrade image from the remote server; and install the firmware upgrade image; and
  each non-seed AP grouped under each of the plurality of subsets is to:
  download the firmware upgrade image from respective primary seed APs corresponding to each of the plurality of subsets; install the firmware upgrade image; and
  reboot the plurality of APs, responsive to successful installation of the firmware upgrade image by the plurality of APs.

19. A non-transitory computer readable medium comprising instructions which, when executed by a processor, cause the processor to:
  group, responsive to a firmware upgrade being initiated, a plurality of APs into a plurality of subsets, the plurality of APs having an identical AP type;
  identify, based on a resource availability of each of the plurality of APs, a primary seed AP corresponding to each of the plurality of subsets, wherein the primary seed AP is to download a firmware upgrade image from a remote server;
  categorize each of the plurality of APs except the primary seed AP, as a non-seed AR wherein the non-seed AP is to download the firmware upgrade image from the primary seed AP; and
  send, to the primary seed AP, a network address of the remote server for downloading the firmware upgrade image.

20. The non-transitory computer readable medium as claimed in claim 19, wherein the plurality of subsets is based on a total count of the plurality of APs and download request processing capacity of the primary seed AP.

* * * * *